(12) United States Patent
Velez

(10) Patent No.: US 9,027,354 B2
(45) Date of Patent: May 12, 2015

(54) SYSTEM AND METHOD FOR RECIRCULATING AND RECOVERING ENERGY FROM COMPRESSOR DISCHARGE BLEED AIR

(75) Inventor: Tomas Antonio Velez, Simpsonville, SC (US)

(73) Assignee: General Elecric Company, Schenectady, NY (US)

( * ) Notice: Subject to any disclaimer, the term of this patent is extended or adjusted under 35 U.S.C. 154(b) by 219 days.

(21) Appl. No.: 13/562,252

(22) Filed: Jul. 30, 2012

(65) Prior Publication Data

US 2014/0026588 A1 Jan. 30, 2014

(51) Int. Cl.
*F02C 3/13* (2006.01)
*F02C 6/08* (2006.01)
*F02C 9/18* (2006.01)

(52) U.S. Cl.
CPC ... *F02C 3/13* (2013.01); *F02C 6/08* (2013.01); *F02C 9/18* (2013.01)

(58) Field of Classification Search
CPC ............... F02C 3/13; F02C 6/08; F02C 9/18
USPC ............................................ 60/782, 785, 795
See application file for complete search history.

(56) References Cited

U.S. PATENT DOCUMENTS

| | | | |
|---|---|---|---|
| 3,659,417 A | | 5/1972 | Grieb |
| 4,163,365 A | * | 8/1979 | Frutschi .......................... 60/773 |
| 4,428,194 A | | 1/1984 | Stokes et al. |
| 4,896,499 A | | 1/1990 | Rice |
| 5,301,500 A | | 4/1994 | Hines |
| 5,678,401 A | * | 10/1997 | Kimura ...................... 60/39.182 |
| 6,027,304 A | | 2/2000 | Arar et al. |
| 6,543,234 B2 | | 4/2003 | Anand et al. |
| 2007/0204625 A1 | | 9/2007 | Thatcher et al. |
| 2007/0271929 A1 | * | 11/2007 | Berry ............................... 60/782 |
| 2010/0170218 A1 | * | 7/2010 | Eluripati et al. ........... 60/39.183 |
| 2010/0175388 A1 | * | 7/2010 | Tillery ............................. 60/785 |

* cited by examiner

*Primary Examiner* — William H Rodriguez
*Assistant Examiner* — Scott Walthour
(74) *Attorney, Agent, or Firm* — Fletcher Yoder P.C.

(57) ABSTRACT

A system includes a gas turbine, an inlet bleed circuit, and a controller. The gas turbine includes a compressor and a turbine. The compressor is configured to produce pressurized air and bleed air. The turbine is configured to produce a first output. The inlet bleed circuit includes a turbo-expander configured to produce a second output from a non-zero first portion of the bleed air. The inlet bleed circuit is also configured to direct a part of the bleed air to an inlet of the compressor. The controller is configured to adjust the gas turbine and the inlet bleed circuit to control the second output of the turbo-expander.

19 Claims, 3 Drawing Sheets

SYSTEM AND METHOD FOR RECIRCULATING AND RECOVERING ENERGY FROM COMPRESSOR DISCHARGE BLEED AIR

BACKGROUND OF THE INVENTION

The subject matter disclosed herein relates to gas turbine systems having an improved method for recovering energy from compressed bleed air discharged from a compressor of a gas turbine.

In certain applications, gas turbine pressure ratios may reach a limit for a compressor of the gas turbine. For instance, in applications where low-BTU (British thermal units) fuels are used as fuel sources in a combustion chamber of the gas turbine, in locations characterized by lower ambient temperatures, or in applications with lower gas turbine loads, the pressure ratio of the compressor may become lower than the pressure ratio of a turbine of the gas turbine. Variations in the compressor pressure ratio may cause surge or stall conditions that affect the operation of the gas turbine.

BRIEF DESCRIPTION OF THE INVENTION

In one embodiment, a system includes a gas turbine with a compressor, a combustion chamber, a turbine, and an inlet bleed circuit. The compressor includes an inlet, an outlet, and a bleed outlet. The compressor is configured to produce pressurized air and bleed air. The combustion chamber is configured to combust the pressurized air to generate exhaust gases. The turbine is configured to produce a first output using the exhaust gases. The inlet bleed circuit is coupled between the bleed outlet and the inlet of the compressor. The inlet bleed circuit is configured to receive the bleed air from the bleed outlet. The inlet bleed circuit includes a first bleed path, a second bleed path, and a first valve assembly. The first bleed path includes a turbo-expander configured to receive and expand a non-zero first portion of the bleed air to produce a second output. The second bleed path is configured to receive and direct a second portion of the bleed air to the inlet of the compressor. The first valve assembly is configured to couple the first bleed path and the second bleed path.

In another embodiment, a system includes a gas turbine, an inlet bleed circuit, and a controller. The gas turbine includes a compressor and a turbine. The compressor is configured to produce pressurized air and bleed air. The turbine is configured to produce a first output. The inlet bleed circuit includes a turbo-expander configured to produce a second output from a non-zero first portion of the bleed air. The inlet bleed circuit is also configured to direct a part of the bleed air to an inlet of the compressor. The controller is configured to adjust the gas turbine and the inlet bleed circuit to control the second output of the turbo-expander.

In yet another embodiment, a method of operating a gas turbine system includes compressing air within a compressor of the gas turbine to produce pressurized air and bleed air. The method also includes producing a first output with a turbine of the gas turbine system. The first output drives the compressor. The method also includes directing the bleed air to an inlet bleed circuit coupled to an inlet of the compressor. The bleed air includes a non-zero first portion and a second portion. The method includes expanding the non-zero first portion within a turbo-expander to produce a second output. The method also includes recirculating a part of the bleed air to the inlet of the compressor, wherein the part of the bleed air includes a sub-portion of the non-zero first portion, the second portion, or a sub-portion of the non-zero first portion and the second portion. The method includes controlling the first output and the second output.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
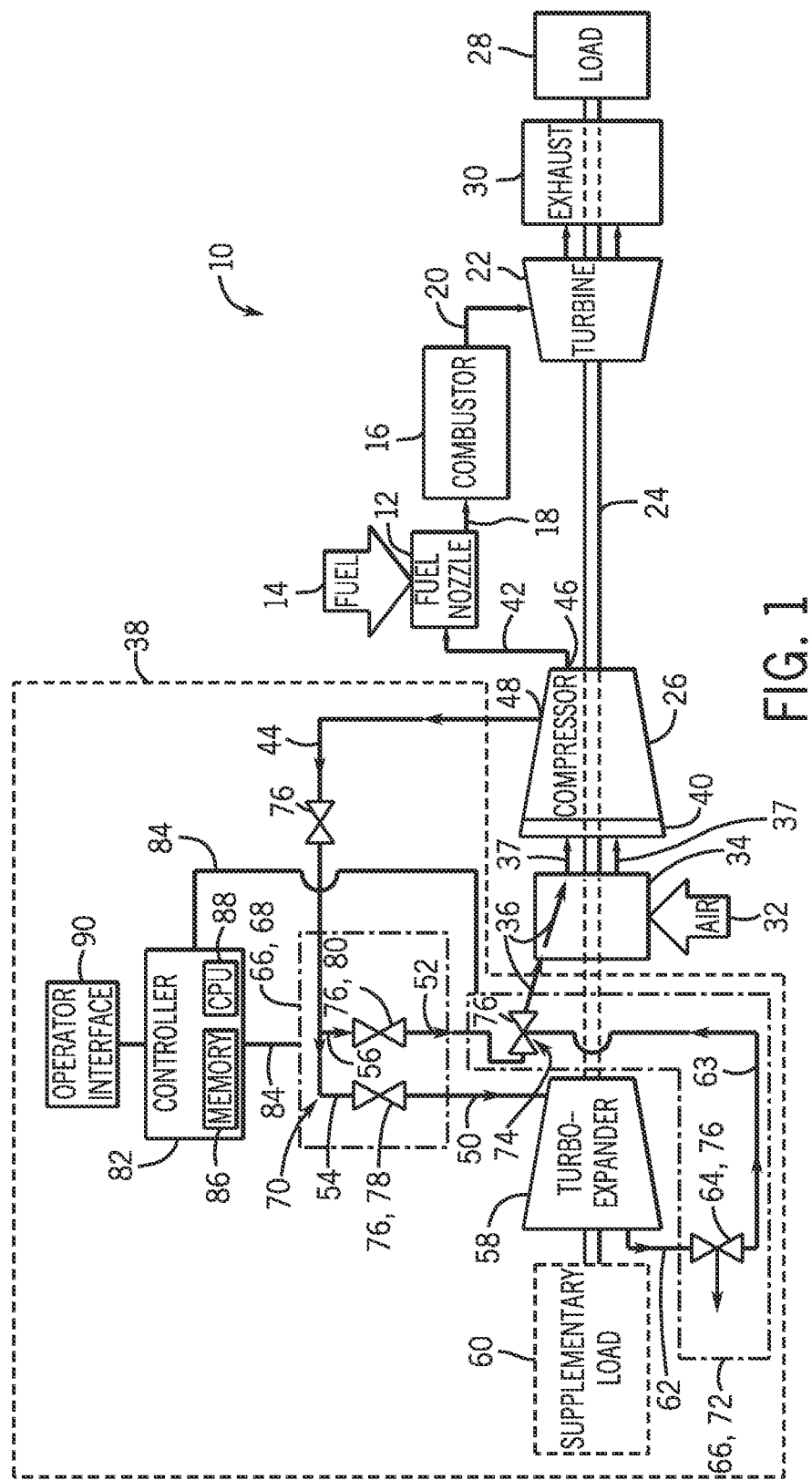
FIG. 1 is a schematic flow diagram of an embodiment of a gas turbine system and an inlet bleed circuit.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

A system and method for recirculating and recovering energy from compressor discharge bleed air as described herein includes an inlet bleed circuit coupled between a bleed outlet and an inlet of the compressor of a gas turbine system. Bleeding a portion of the compressed air from the compressor of the gas turbine may help protect the compressor from surge or stall conditions. However, bleeding compressed air discharged from the compressor may decrease net efficiency of the gas turbine system, since the energy expended to raise the pressure of the air within the compressor is not recovered. The amount of bleed air that is bled to protect the compressor may be a function of ambient conditions and gas turbine output. Increasing the temperature and decreasing the density of air at the compressor inlet may affect the gas turbine output and/or help protect the compressor. However, heating air at the compressor inlet uses energy. The compressor heats the air as it is pressurized, thus the energy of the bleed air may be used to heat the air at the compressor inlet. The energy of the bleed air may also be expanded in a turbomachine (e.g., turbo-expander) to recover some of the energy used to pressurize the bleed air to produce a second output. Recirculating the heated bleed air at the inlet may be an irreversible process, whereas expanding the bleed air in a turbo-expander and recirculating the expanded bleed air may be a reversible process that also cools the bleed air. The irreversible process of heating the air at the compressor inlet may readily protect the compressor from stall and/or surge conditions; however, it may reduce the output and heat rate more than the reversible process of expanding the bleed air to recover energy and recirculating the expanded bleed air portion. Controlling a split of the bleed air to be expanded and recirculated from the bleed air to be recirculated may increase the flexibility of the gas turbine system to protect the compressor for a wider range of operating conditions (e.g., fuel quality, ambient temperature, load, and so forth).

The bleed air may be directed along a first bleed path and/or a second bleed path. The first bleed path includes the turbo-expander and may be configured to direct a first bleed air portion of the bleed air to the inlet of the compressor. The first bleed air portion may be any non-zero portion of the bleed air. The first bleed path may also be configured to cool the first bleed air portion of the bleed air. The second bleed path may be configured to direct the remainder (e.g., a second bleed air portion) of the bleed air directly to the inlet of the compressor. A first valve assembly may couple the first and second bleed paths to the inlet of the compressor and be configured to adjust the inlet temperature of the compressor by controlling the split between the first and second bleed air portions of the bleed air that flows into the inlet of the compressor. The first valve assembly may also be configured to adjust the density and quantity of the recirculated air directed into the inlet. In an embodiment, a second valve assembly may be coupled to the bleed outlet, the first bleed path, and the second bleed path. The second valve assembly may be configured to adjust the bleed air as a percentage of the pressurized air directed to a combustor and/or to adjust a ratio between the first and second bleed air portions of the bleed air. Presently contemplated embodiments may include the first valve assembly alone, the second valve assembly alone, or both the first and second valve assemblies.

In certain embodiments, a controller may be configured to control the first valve assembly and/or the second valve assembly. In this way, the controller may be configured to control the inlet temperature, the density and quantity of the air at the inlet, the percentage of the bleed air, and the split between the first and second bleed air portions of the bleed air. The controller may also be configured to control a first output of the turbine and/or a second output of the turbo-expander. The controller may also be configured to control the first and/or second bleed air portions of the bleed air directed to the first bleed path based at least in part on an operating condition of the gas turbine (e.g., air quality, fuel quality, ambient temperature), a compression ratio of the compressor, a desired heat rate of the system, or a desired output of the system or combinations thereof. In some embodiments, the second output may be mechanically or electrically coupled with the first output to a common load.

Turning now to the drawings, FIG. 1 illustrates a block diagram of an embodiment of a gas turbine system 10 having an inlet bleed circuit 38. As depicted, one or more fuel nozzles 12 directs fuel 14 (e.g., a liquid fuel and/or gas fuel, such as natural gas) into a combustor 16. The combustor 16 ignites and combusts the air-fuel mixture 18, and then passes hot pressurized exhaust gas 20 into a turbine 22. The exhaust gas 20 passes through turbine blades of a turbine rotor in the turbine 22, thereby driving the turbine 22 and the coupled shaft 24 to rotate. The shaft 24 is coupled to several components (e.g., compressor 26, load 28, and so forth) throughout the gas turbine system 10. Eventually, the exhaust gases 20 of the combustion process may exit the gas turbine system 10 via an exhaust outlet 30.

In an embodiment of the gas turbine system 10, compressor vanes or blades are included as components of the compressor 26. Blades within the compressor 26 are coupled to the shaft 24, and will rotate as the shaft 24 is driven by the turbine 22. The compressor 26 may intake ambient air 32 to the gas turbine system 10 via an air intake 34. Further, the shaft 24 may be coupled to and drive the load 28. As will be appreciated, the load 28 may be any suitable device that may generate power via the rotational output of the gas turbine system 10, such as a power generation plant or an external mechanical load. For example, the load 28 may include an electrical generator, a propeller of an airplane, and so forth. The air intake 34 draws the ambient air 32 into the gas turbine system 10 via a suitable mechanism, such as a cold air intake, for subsequent mixture of the ambient air 32 with the fuel 14 via the fuel nozzle(s) 12. The air intake 34 may also draw recirculated air 36 from an inlet bleed circuit 38. The compressor 26 is configured to receive the ambient air 32 and the recirculated air 36, collectively as inlet air 37, at an inlet 40. The compressor 26 may compress the inlet air 37 into pressurized air 42 by rotating blades within the compressor 26. A portion of the pressurized air 42 (e.g., bleed air 44) may be bled from the compressor 26 into the inlet bleed circuit 38. When the compressor 26 compresses the inlet air 37, the compressor 26 adds energy to the inlet air 37 to increase the pressure, and incidentally increase the temperature. Thus, the pressurized air 42 and bleed air 44 are warmer and at higher pressures than the ambient air 32. The pressurized air 42 may be fed from an outlet 46 into the one or more fuel nozzles 12, which may mix the pressurized air 42 and the fuel 14 to produce an air-fuel mixture 18 suitable for combustion. Again, the turbine 22 is driven by the exhaust gases 20, and the turbine 22 drives the compressor 26 and the load 28.

The inlet bleed circuit 38 is coupled to the inlet 40 of the compressor 26 and a bleed outlet 48 of the compressor 26. The bleed outlet 48 is configured to direct the bleed air 44 along the inlet bleed circuit 38. As discussed in detail below, the inlet bleed circuit 38 may be configured to expand a portion of the bleed air 44 to produce an output, to direct all or part of the bleed air 44 to the inlet 40 to protect the compressor 26, or combinations thereof. In some embodiments, directing all or part of the bled air 44 through a turbo-expander may also protect the compressor 26. The inlet bleed circuit 38 includes a first bleed path 50 and a second bleed path 52. Each bleed path 50, 52 is configured to receive all or part of the bleed air 44. Each bleed path 50, 52 is in fluid connection with the bleed outlet 48 and the inlet 40 to enable the bleed air 44 to recirculate through the compressor 26.

The first bleed path 50 is configured to receive a first bleed air portion 54 of the bleed air 44 and the second bleed path 52 is configured to receive a second bleed air portion 56 of the bleed air 44. The bleed air 44 may be divided completely between the first bleed air portion 54 along the first bleed path 50 and the second bleed air portion 56 along the second bleed path 52. The first bleed air portion 54 may include the entire flow of bleed air 44 or any non-zero portion of the bleed air 44. For example, in some embodiments the first bleed air portion 54 may be approximately ⅛, ¼, ⅓, ⅜, ½, ⅝, ⅔, ¾, or ⅞ of the bleed air 44. The second bleed air portion 56 is the balance of the bleed air 44 after subtracting out the first bleed air portion 54.

The first bleed path 50 includes a turbo-expander 58 configured to expand the first bleed air portion 54 to extract energy. The turbo-expander 58 may, for instance, be a turbine configured to expand high-pressure gases (e.g., the first bleed air portion 54) to produce work. However, the turbo-expander 58 may also be any suitable equipment capable of recovering the pressure energy of the first bleed air portion 54. The turbo-expander 58 may be used to drive the load 28 and/or a supplementary load 60 (e.g., a supplementary electrical generator). In certain embodiments, the first bleed air portion 54 may be expanded within the turbo-expander 58 to drive a supplementary load 60 (e.g., generator, fan). In some embodiments, the turbo-expander 58 may be coupled to the shaft 24 as shown by the dashed lines. In other embodiments, the turbo-expander 58 and supplementary load 60 may be separate from the load 28 (i.e., not coupled to the shaft 24). In this way, various embodiments of the turbo-expander 58 may be configured to drive only the supplementary load 60, only the load 28, or both the supplementary load 60 and the load 28. By recovering the energy stored within the pressurized first bleed air portion 54 through the turbo-expander 58, the efficiency of the entire gas turbine system 10 may remain relatively high. The turbo-expander 58 may expand the first bleed air portion 54 isentropically, resulting in an expanded portion 62 with a decreased pressure and temperature. In some embodiments, the expansion of the first bleed air portion 54 within the turbo-expander 58 is a substantially reversible process. The turbo-expander 58 may efficiently recover most of the energy used by the compressor 26 to pressurize the first bleed air portion 54. In some embodiments, the expanded portion 62 may be further cooled along the first bleed path 50. The first bleed path 50 may direct a sub-portion 63 (e.g., 0 to 100% of the expanded portion 62) to the inlet 40 and the rest of the expanded portion 62 to a vent 64. In some embodiments, the first bleed path 50 may direct the entire expanded portion 62 to the inlet 40 or to the vent 64. The vent 64 may be along the first bleed path 50 or part of a valve assembly as discussed below.

The expanded portion 62 may have a temperature greater than or equal to the ambient air 32, and be at a pressure greater than or equal to the ambient air 32. The sub-portion 63 of the expanded portion 62 and the second bleed air portion 56 may be directed to the inlet 40 to mix with the ambient air 32 to heat the inlet air 37 to a desired temperature. Heating the inlet air 37 may decrease the mass flow of inlet air 37 into the compressor because of a decrease in corrected speed. Directing the first bleed air portion 54 of the bleed air 44 through the turbo-expander 58 enables the turbo-expander 58 to capture power that would otherwise be lost if the first bleed air portion 54 was directed to the inlet 40 along the second bleed path 52. The turbo-expander 58 is configured to decrease the temperature of the first bleed air portion 54 and expand the first bleed air portion 54. In some embodiments, directing the cooled expanded portion 62 to the inlet 40 (in lieu of increasing the temperature at the inlet 40 via directing the second bleed air portion 56 to the inlet 40) may also protect the compressor 26 from a surge or stall condition by lowering the operating line. Extracting the bleed air 44 from the compressor 26, without heating the inlet air 37 to the compressor 26 may reduce the mass flow into the turbine 22 and reduce the turbine inlet pressure. The operating line for a gas turbine is defined at the inlet to the turbine 22 and is governed by relationships that include mass flow into the turbine 22 and temperature of the mass flow. Directing the entire bleed air 44 through the second bleed path 52 to the inlet 40 inlet in an irreversible manner may heat the inlet air 37 and lower the corrected speeds of the compressor 22. The corrected speed may be lowered to reduce the mass flow to the turbine 22 and thus lower the operating line as needed to provide adequate surge margin. Directing a non-zero portion (e.g., first bleed air portion 54) of the bleed air 44 through the first bleed path 50 and turbo-expander 58 enables the operating line of the compressor 26 to be lowered to protect the compressor 26 from surge conditions. Directing the non-zero portion of the bleed air 44 through the first bleed path 50 also enables the mass flow to the turbine 22 to be reduced without increasing the temperature of the inlet air 37 as much as with only the second bleed path 52. Thus, directing a non-zero portion of the bleed air 44 along the first bleed path 50 with the turbo-expander 58 enables a reduced effect of the bleed air 44 on the compressor corrected speed, as compared to a only directing the bleed air 44 along the second bleed path 52 (e.g., the inlet bleed heat system) to the inlet 40. The first bleed path 50 with the turbo-expander 58 enables compressor surge protection without substantially affecting other operating parameters, such as the compressor discharge temperature, corrected speeds, exhaust energy, and so forth.

The inlet bleed circuit 38 includes at least one valve assembly 66. The at least one valve assembly 66 is configured to couple the first bleed path 50 and the second bleed path 52. In some embodiments, a first valve assembly 68 couples the first and second bleed paths 50, 52 at a diverging point 70. In other embodiments, a second valve assembly 72 couples the first and second bleed paths 50, 52 at a converging point 74. Some embodiments may have both the first valve assembly 68 and the second valve assembly 72. Each valve assembly 66 may include one or more gate valves, butterfly valves, globe valves, ball valves, check valves, and so forth. A valve assembly 66 may include combinations of valves 76. Each valve 76 may be configured to adjust flow through the inlet bleed circuit 38. For example, a closed valve 76 may block substantially all flow through the valve 76, whereas a partially open valve 76 may reduce a flow through the valve 76. In some embodiments, the first valve assembly 68 may have a first valve 78 downstream of the diverging point 70 along the first bleed path 50 and a second valve 80 along the second bleed path 52. The first valve 78 and second valve 80 may be configured to be adjusted concurrently to divide the bleed air 44 into the non-zero first bleed air portion 54 and the second bleed air portion 56. For example, closing the second valve 80 completely directs the entire flow of bleed air 44 through the first bleed path 50, thus the first bleed air portion 54 is the entire flow of bleed air 44. In some embodiments, opening the first and second valves 78, 80 may increase the bleed air 44 as a percentage of the pressurized air 42. Partially opening the first and second valves 78, 80 may divide the bleed air 44 into the first bleed air portion 54 and second bleed air portion 56 based at least in part on a relative ratio between the openness of the first and second valves 78, 80. Partially closing the first and second valves 78, 80 may reduce the bleed air 44 as a percentage of the pressurized air 42. In some embodiments, fully closing the first and second valves 78, 80 may block the entire bleed air 44 into the first and second bleed paths 50, 52, thus eliminating the recirculated air 36 component of the inlet air 37. In certain embodiments, the first valve assembly 68 may have a valve 76 upstream of the diverging point 70 that is configured to adjust the bleed air 44 as a percentage of the pressurized air 42 (i.e. mass flow of the bleed air 44).

In some embodiments, the second valve assembly 72 at the converging point 74 couples the first and second bleed paths 50, 52 with the inlet 40. The second valve assembly 72 may also couple the first and second bleed paths 50, 52 with the air intake 34 upstream of the inlet 40. The second valve assembly 72 is configured to receive and join the second bleed air portion 56 and the entire expanded portion 62 or the second bleed air portion 56 and the sub-portion 63 of the expanded portion 62 into the recirculated air 36 directed to the inlet 40. As discussed above with the first valve assembly 68, the second valve assembly 72 may include one or more valves 76 of the same or different type. The second valve assembly 72 may be configured to adjust the total mass flow of the recirculated air 36 directed to the inlet 40. For example, the second valve assembly 72 may adjust the total mass flow of the recirculated air 36 to be less than approximately 5%, 10%, 15%, or 25% of the mass flow of the inlet air 37. The mass flow of the second bleed air portion 56 and expanded portion 62 may be greater than a desired recirculated airflow 36. The second valve assembly 72 may be configured to vent the second bleed air portion 56 and expanded portion 62 to produce the desired recirculated airflow 36. For example, the vent 64 may be a part of the second valve assembly 72. In some embodiments, the second valve assembly 72 may be configured to separately adjust the mass flow of the expanded portion 62 and the mass flow of the second bleed air portion 56 to adjust the relative quantities of each in the recirculated air 36. In this manner, the second valve assembly 72 may be configured to adjust the inlet temperature of the inlet air 37. For example, in an embodiment where the bleed air 44 is evenly split between the first and second bleed air portions 54, 56, the second bleed air portion 56 component may be at approximately 417° C. (782° F.), the expanded portion 62 may be at approximately 89° C. (193° F.), and the ambient air 32 may be at approximately 15° C. (59° F.). The combined output of the turbine 22 and turbo-expander 58 may be approximately 248 MW. The corrected speed ratio of the compressor 26 may be approximately 97.6%. The second valve assembly 72 may be configured to shut off the second bleed air portion 56 and increase the expanded portion 62 so that the inlet temperature of the inlet air 37 is approximately 19° C. (66° F.). The combined output of the turbine 22 and turbo-expander 58 may be approximately 262 MW. The corrected speed ratio of the compressor 26 may be approximately 99.3%. Other embodiments of gas turbine systems 10 may have different configurations with different outputs and corrected speed ratios. Through adjustment of the total mass flow of the recirculated air 36 and the temperature of the inlet air 37, the second valve assembly 72 may be configured to adjust the total output of the gas turbine system 10.

The first valve assembly 68 and the second valve assembly 72 may be used together to affect the inlet air 37 directed to the inlet 40 and the bleed air 44 extracted through the bleed outlet 48 of the compressor 26. For example, the first valve assembly 68 may direct substantially the entire flow of bleed air 44 through the first bleed path 50 to produce a second output with the turbo-expander 58. Directing the entire flow of bleed air 44 through the turbo-expander 58 may increase the second output and increase the efficiency of the gas turbine system 10 through the recovery of energy. Directing the entire flow of bleed air 44 along the first bleed path 50 may recover more energy than directing the entire flow of bleed air 44 through the second bleed air path 52. The flow rate of the expanded portion 62 may be greater than desired flow rate of recirculated air 36, so the second valve assembly 72 may be adjusted to restrict the flow of the expanded portion 62 or vent the expanded portion 62 at the vent 64 or second valve assembly 72. In some embodiments, the vent 64 may release some of the expanded portion 62 and direct the remaining sub-portion 63 to the converging point 74 and the inlet 40.

As another example of affecting the flow of the inlet air 37 and the bleed air 44, the first valve assembly 68 may be configured to adjust the flow of bleed air 44 as a percentage of the pressurized air 42 to protect the compressor 26 from surge or stall conditions, and the second valve assembly 72 may be configured to adjust the expanded portion 62 and the second bleed air portion 56 to produce the recirculated air 36 at a desired mass flow, temperature, or pressure, or combinations thereof. The first valve assembly 68 may be configured to divide the bleed air 44 into the non-zero first bleed air portion 54 and second bleed air portion 56 components. Some energy of the first bleed air portion 54 may be recovered by the turbo-expander 58, lowering the energy of the expanded portion 62. The expanded portion 62 may also be cooler than the first bleed air portion 54. The second bleed air portion 56 may have more energy in the form of pressure and heat than the expanded portion 62. Both the expanded portion 62 and the second bleed air portion 56 components of the recirculated air 36 may be used to warm the ambient air 32 to a desired inlet temperature. The expanded portion 62 and the second bleed air portion 56 may be combined in varying amounts at the second valve assembly 72 to produce a desired mass flow of the recirculated air 36 with a desired energy (e.g., temperature and/or pressure). In some embodiments, the recirculated air 36 is the entire second bleed air portion 56 while the entire first bleed air portion 54 is expanded through the turbo-expander 58 to produce the second output. In some embodiments, the recirculated air 36 is a combination of the second bleed air portion 56 with the expanded portion 62 or a sub-portion 63. The second valve assembly 72 may be configured to adjust the expanded portion 62 and the second bleed air portion 56 components of the recirculated air 36 so that the inlet air 37 has a desired mass flow, temperature, or pressure, or combinations thereof. In this way, the first and second valve assemblies 68, 72 may be configured to adjust the mass flow of the bleed air 44 to protect the compressor 26, to direct the first bleed air portion 54 to recover energy of the bleed air 44, and to use the heat of the expanded portion 62 and/or the second bleed air portion 56 to adjust the inlet temperature of the compressor 26.

Presently contemplated embodiments include a controller 82 coupled to the inlet bleed circuit 38. The controller 82 may be coupled to the at least one valve assembly 66 to control the one or more valves 76 through control lines 84. The controller 82 may be configured to open and close the valves 76 to control the bleed air portion 44 through the inlet bleed circuit 38. In certain embodiments, the controller 82 may include a memory 86 to store instructions and a processor 88 configured to process the instructions. The controller 82 may include an operator interface 90 configured to receive operator input. In some embodiments, the controller 82 may be configured to control the flow of bleed air 44 as a percentage of the compressed air 42 through adjusting the first or second valve assembly 68, 72. The controller 82 may be configured to divide the bleed air 44 into the non-zero first bleed air portion 54 and second bleed air portion 56. By dividing the bleed air 44, the controller 82 is configured to direct the first bleed air portion 54 to the first bleed path 50 and to direct the second bleed air portion 56 to the second bleed path. The controller 82 may also be configured to control the vent 64 and to direct the entire expanded portion 62 or the sub-portion 63 to the inlet 40. In some embodiments, the controller 82 may control the second valve assembly 72 to combine the second bleed air portion 56 and expanded portion 62 or sub-portion 63 to form the recirculated air 36 component of the inlet air 37. By controlling the bleed air 44, the first bleed air portion 54, the second bleed air portion 56, and the inlet air 37, the controller 82 may control the performance of the compressor 26 and the output of the turbine 22.

The controller 82 may be configured to control the performance of the compressor 26 by adjusting the properties of the inlet air 37. Controlling the bleed air 44 as a percentage of the pressurized air 42 affects the mass flow to the combustor 16 or the turbine 22 to protect the compressor 26 from stall or surge operating conditions (e.g., high pressure downstream of the compressor outlet 46). By controlling the first bleed air portion 54, the second bleed air portion 56, and properties (e.g., temperature, mass flow) of the recirculated air 36, the controller 82 may adjust the output of the turbine 22 and the efficiency of the gas turbine system 10 by affecting the inlet air 37. For example, high temperature inlet air 37 may decrease the mass flow of pressurized air 42 exiting the compressor 26 and decrease the output of the turbine 22. Low temperature inlet air 37 may increase the mass flow of the pressurized air 42 and increase the output of the turbine 22. The controller 82 may also adjust the first bleed air portion 54 to adjust the output of the turbo-expander 58 and the efficiency of the gas turbine system 10. For example, expanding the first bleed air portion 54 along the first bleed path 50 in a substantially reversible process recovers at least some of the energy of the bleed air 44 and increases the efficiency of the gas turbine system 10. The turbo-expander 58 enables the inlet bleed circuit 38 to recover energy from the bleed air 44 while protecting the compressor 26 from surge or stall conditions. In some embodiments, the recovered energy may be combined with the energy extracted through the turbine 22 to drive the common load 28. Alternatively, the recovered energy may drive the supplementary load 60.

Figure 2:
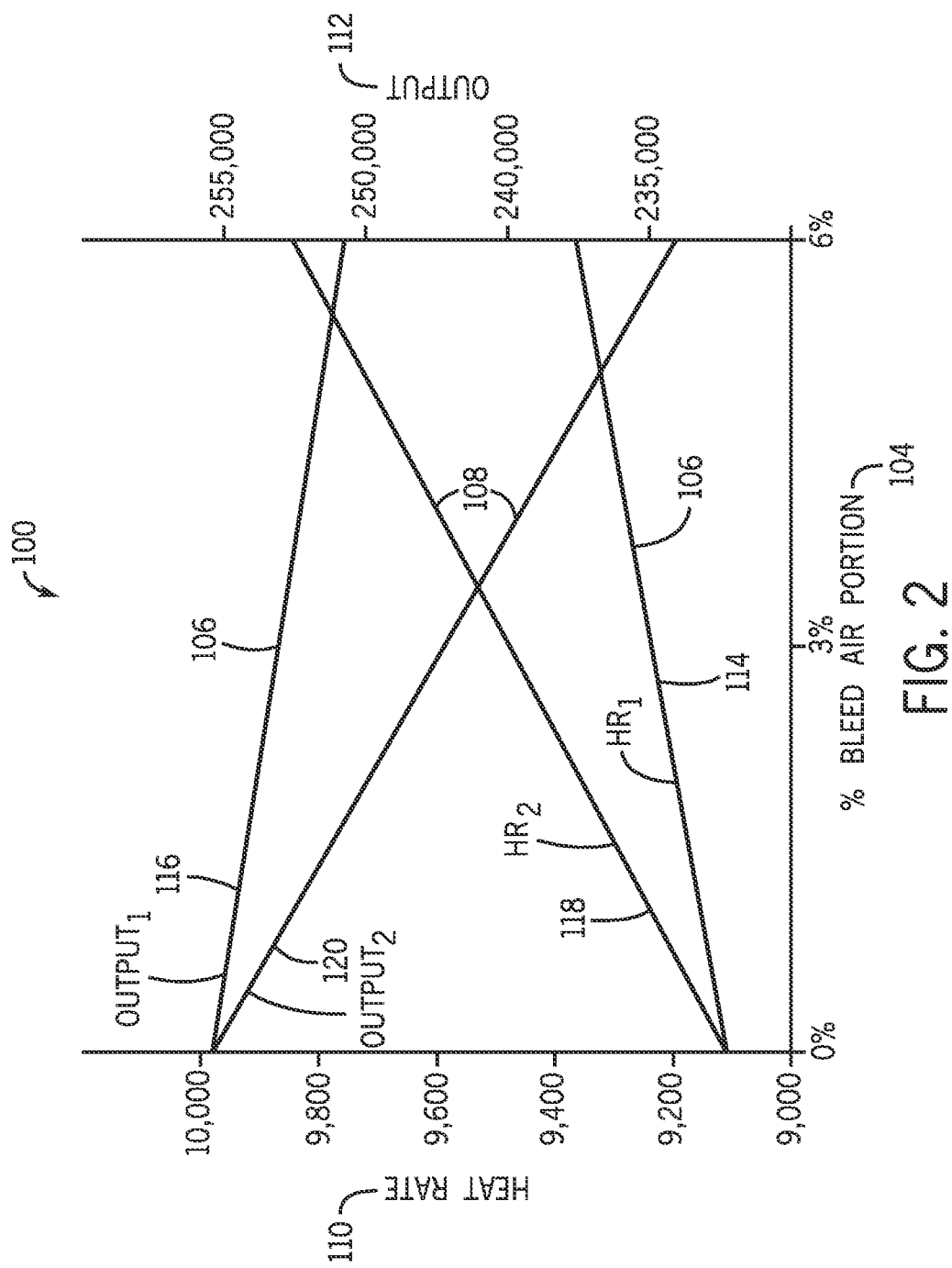
FIG. 2 is a chart showing heat rate and output as a function of bleed rate percentage of the gas turbine of FIG. 1.
Figure 3:
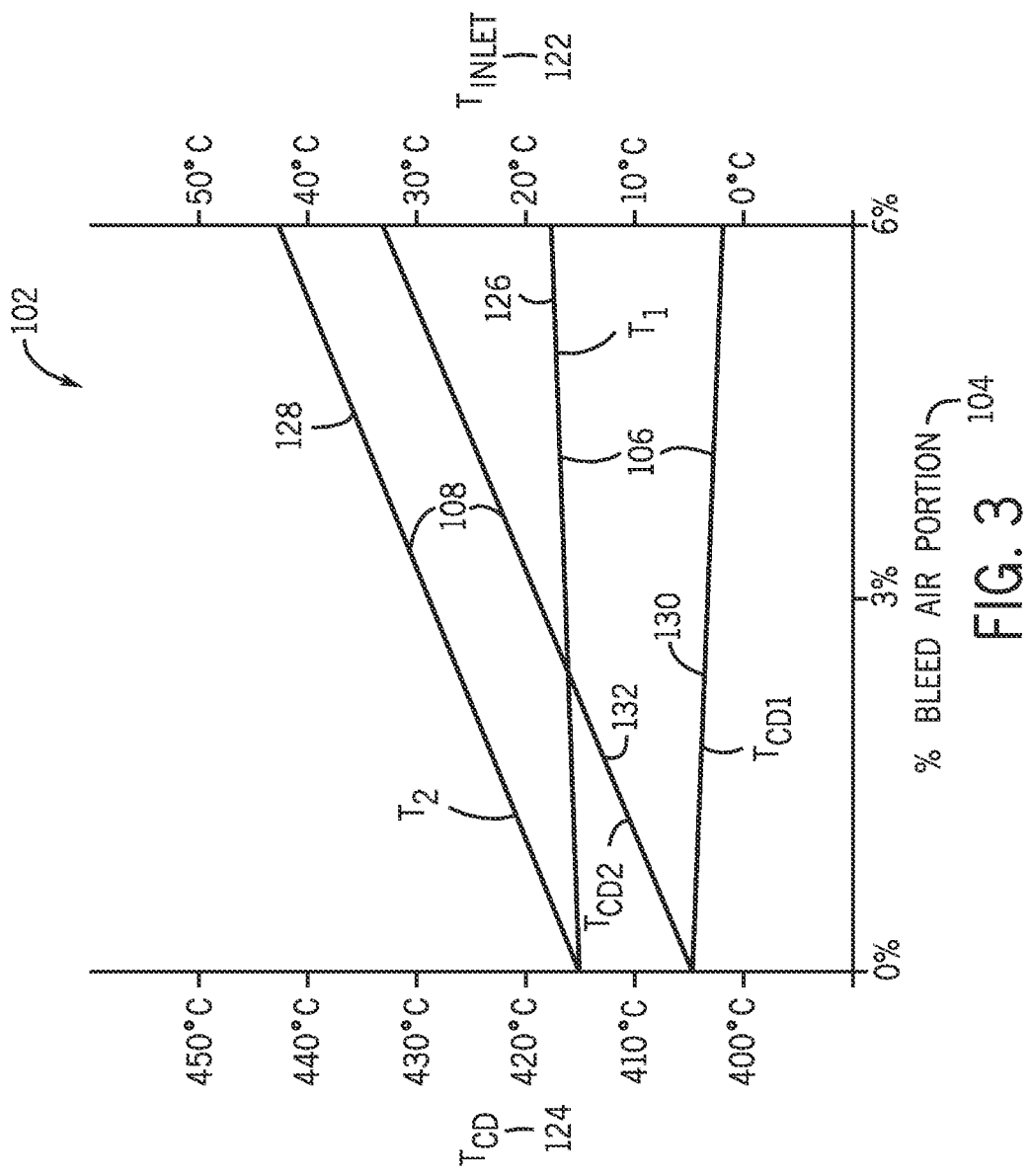
FIG. 3 is a chart showing inlet temperature and compressor discharge temperature as a function of bleed rate percentage of the gas turbine system of FIG. 1.

FIGS. 2 and 3 illustrate relationships between properties of the gas turbine system 10 and the bleed air 44 of the embodiments discussed above. FIG. 2 illustrates the heat rate and output of embodiments of the gas turbine system 10 in a first chart 100. FIG. 3 illustrates the temperature of the compressor discharge and the temperature of the compressor inlet of embodiments of the gas turbine system 10 in a second chart 102. The X-axis 104 of each chart is the bleed air 44 as a percentage of the pressurized air 42 produced by the compressor 26. The bleed air 44 as a percentage may range from approximately 0 to 15%, 1 to 10%, or approximately 3 to 6%, or any subrange therein. The charts 100 and 102 depict embodiments where the bleed air 44 is between 0 and 6% of the pressurized air 42, although presently contemplated embodiments are not limited to bleed air portions less than 6%. In each chart, a first set 106 of curves illustrates the properties of the gas turbine system 10 where the entire flow of bleed air 44 is directed through the first bleed path 50 and the turbo-expander 58 in a substantially reversible process. A second set 108 of curves illustrates the properties of the gas turbine system 10 where the entire flow of bleed air 44 is directed through the second bleed path 52 (e.g., IBH system) in a substantially irreversible process. The first and second sets 106, 108 of curves for each property have the same values where the bleed air 44 is 0% because no bleed air portion is available to the turbo-expander 58 or the IBH system to affect the properties of the system. In some embodiments, the differences between directing the bleed air 44 through the first bleed path 50 or the second bleed path 52 are greater when the percentage of bleed air 44 is greater.

The chart 100 of FIG. 2 illustrates a heat rate and output of embodiments of the gas turbine system 10 discussed above. The left Y-axis 110 is the heat rate (i.e., a measure of efficiency) of the gas turbine system 10 and the right Y-axis 112 is the combined output of the gas turbine system 10 from the turbine 22 and turbo-expander 58. The first heat rate curve 114 and first combined output curve 116 of the first set of curves 106 illustrate embodiments where the entire flow of bleed air 44 is directed along the first bleed path 50 having the turbo-expander 58 to recover energy from the bleed air 44. The second heat rate curve 118 and the second output curve 120 illustrate embodiments where the entire flow of bleed air 44 is directed along the second bleed path 52, such as an inlet bleed heat system. The first heat rate curve 114 is less than the second heat rate curve 118 for the illustrated embodiments.

The heat rate 110 is a measure of the efficiency of a system, and may be in units of British Thermal Units (BTUs) per kilowatt-hour (kWh). A low heat rate 110 indicates a high efficiency as less energy (BTU) through fuel is used to produce mechanical or electrical energy (kWh). In the illustrated embodiments, the first heat rate curve 114 may increase between approximately 9,100 and 9,300 BTU/kWh and the second heat rate curve 118 may increase between approximately 9,100 and 10,000 BTU/kWh for bleed air portions between 0 and 6%. Directing the entire flow of bleed air 44 through the IBH system (e.g., the second bleed path 52) may increase the heat rate 110 and decrease the efficiency of the system because some of the energy in the bleed air 44 is lost through the substantially irreversible process. As discussed above, directing all or part of the bleed air 44 through the turbo-expander 58 (e.g., the first bleed path 50) enables the system to recover some of the energy of the bleed air 44 through the substantially reversible process. The recovered energy may be used to drive a supplementary load 60 alone and/or to drive a common load 28 with the gas turbine. In this way, the recovered energy produces an output and increases the efficiency of the gas turbine system 10. In some embodiments, the energy lost by directing the entire flow of bleed air 44 through the turbo-expander 58 is approximately 25%, 50%, or 75% less than the energy lost by directing the entire flow of bleed air 44 of the same mass flow through the IBH system.

The first combined output curve 116 is greater than the second output curve 120 for the illustrated embodiments, thus directing the entire flow of bleed air 44 through the turbo-expander 58, resulting in greater combined output of the system than directing the entire flow of bleed air 44 through the IBH system. The combined output 112 may be in units of kWh or BTUs. In the illustrated embodiments, the first combined output curve 116 may decrease between approximately 255,000 and 250,000 BTUs and the second output curve 120 may increase between approximately 255,000 and 234,000 BTUs for bleed air portions increased from 0 and 6%. Directing the entire flow of bleed air 44 through an inlet bleed heat system may decrease the total output of the system because some of the energy used to compress the bleed air 44 is lost. Directing a non-zero portion of the bleed air 44 through the turbo-expander 58 may enable the recovery of some of the energy of the bleed air 44 so that the total combined output of the system may decrease less compared to directing the bleed air 44 through the inlet bleed heat system. For example, directing the entire flow of bleed air 44 through the turbo-expander 58 may decrease the energy output lost by up to approximately 25%, 50%, or 75% or more than the energy output lost by directing the entire flow of bleed air 44 through the inlet bleed heat system.

The second chart 102 of FIG. 3 illustrates the compressor inlet temperature 122 on the right Y-axis and the compressor discharge temperature 124 on the left Y-axis. As discussed above with FIG. 1, the compressor 26 is configured to receive inlet air 37 at an inlet temperature 122 at the compressor inlet 40. The compressor inlet temperature 122 affects the density, temperature (e.g., compressor discharge temperature 124), and mass flow of the pressurized air 42 at the outlet 46 and bleed air 44 at the bleed air outlet 48 (FIG. 1). In the illustrated embodiments, the first inlet curve 126 may increase between approximately 15° C. and 18° C. and the second inlet curve 128 may increase between approximately 15° C. and 41° C. for bleed air portions between 0 and 6%. The pressurized air 42 and bleed air 44 may be warmer than the ambient air 32. Directing the entire flow of bleed air 44 along the substantially irreversible second bleed path 52 (e.g., IBH system) as indicated by the second inlet curve 128 may increase the compressor inlet temperature 122. Directing the entire flow of bleed air 44 along the first bleed path 50 (e.g., the turbo-expander 58) may cool the bleed air 44 so that the inlet temperature 122 does not warm as much as with the IBH system. In some embodiments, the first bleed path 50 may cool the bleed air 44 to approximately the temperature of the ambient environment so that the compressor inlet temperature shown by the first inlet curve 126 increases less than the second inlet curve 128 as the bleed air 44 percentage increases. Thus, increasing the bleed air 44 directed along the first bleed path 50 as shown by the first inlet curve 126 may affect the compressor inlet temperature 122 less than increasing the bleed air 44 directed along the second bleed path 52, as shown by the second inlet curve 128. Cooler inlet air temperatures 122 may result in greater mass flows through the compressor 26 and greater output of the turbine 22. Warmer inlet air temperatures 122 may protect the compressor 26 in low load conditions. Cooler inlet air temperatures 122 may protect the compressor 26 at higher load conditions.

In some embodiments, the compressor discharge temperature 124 of the first discharge curve 130 may decrease or stay approximately the same as the amount of bleed air 44 directed along the first bleed path 50 increases. In the illustrated embodiments, the first discharge curve 130 may decrease between approximately 404° C. and 400° C. and the second discharge curve 132 may increase between approximately 404° C. and 433° C. for bleed air portions between 0 and 6%. The cooler inlet air temperature 122 may result in a dense air flow through the compressor 26, and the first discharge curve 130 may decrease at least in part due to less energy applied by the compressor 26 per unit of mass of the dense air flow. Increasing the amount of bleed air 44 recirculated along the second bleed path 52 may decrease the density and mass flow through the compressor 26. Less mass flow through the compressor 26 may increase the compressor discharge temperature 124 as shown by the second discharge curve 132. Additionally, the inlet temperature 122 is higher and may thus increase the compressor discharge temperature 124. A low compressor discharge temperature 124 may enable more fuel 14 to be combusted in the combustor 16 than a high compressor discharge temperature 124. In some embodiments, a low compressor discharge temperature 124 may enable the pressurized air 42 to rise in temperature in the combustor 16 more than a high compressor discharge temperature 124, which may result in a greater output from the turbine 22.

Presently contemplated embodiments are not limited to directing the entire flow of bleed air 44 along either the first bleed path 50 as indicated by the first set of curves 106 or the second bleed path 52 as indicated by the second set of curves 108. As discussed above, the controller 82 may be configured to adjust the first bleed air portion 54 directed along the first bleed path 50 and the second bleed air portion 56 directed along the second bleed path 52 to produce any desired division of the bleed air 44 into the non-zero first bleed air portion 54 and the second bleed air portion 56. The controller 82 may be configured to adjust the split of the bleed air 44 by controlling one or more valve assemblies 66. In this manner, the controller 82 may be configured to adjust the heat rate 110, output 112, compressor inlet temperature 122, or compressor discharge temperature 124, or combinations thereof. The controller 82 may be configured to divide the bleed air 44 into the first bleed air portion 54 and the second bleed air portion 56 to produce one or more desired properties of the system. For example, directing a 3% first bleed air portion 54 and a 3% second bleed air portion 56 along the first and second bleed paths 50, 52 respectively may result in a heat rate between approximately 9,200 and 9,500 BTU/kWh (e.g., 9,350 BTU/kWh) and a system output between approximately 245,000 and 253,000 BTUs (e.g., 249,000 BTUs). Similarly, directing a 3% first bleed air portion 54 and a 3% second bleed air portion 56 along the first and second bleed paths 50, 52 respectively may result in a compressor inlet temperature between approximately 16° C. and 28° C. (e.g., 22° C.) and a compressor discharge temperature between approximately 403° C. and 419° C. (e.g., 411° C.).

Presently contemplated embodiments discussed above include directing bleed air 44 of pressurized air 42 from a compressor 26 to protect the compressor 26 from surge and/or stall conditions and recovering energy from the bleed air 44 to drive a supplementary load 60 or contribute to driving a common load 28. Technical effects of the invention include adding flexibility to a gas turbine system 10 by offering an inlet bleed circuit 38 with multiple bleed paths 50, 52 to adjust the protection offered to the compressor 26 and output produced by the gas turbine system 10. Directing the bleed air 44 directly to the compressor inlet (e.g., IBH system) may stabilize the operation of the compressor 26 and protect against surge and stall conditions at low loads while decreasing the output of the gas turbine system 10. Directing the bleed air 44 through a turbo-expander 58 before directing the bleed air 44 to the inlet may stabilize the operation of the compressor 26 at higher loads without decreasing the output of the gas turbine system 10 as much as with the IBH system alone. In this way, the operational range of the gas turbine system 10 may be expanded to provide compressor protection at a range of load conditions with greater output at higher loads. Adjusting the quantity of the bleed air 44 as a percentage of the pressurized air 42 and adjusting how the bleed air 44 is recirculated to the compressor inlet enables control of the output of the gas turbine system 10 in a variety of operating and load conditions. The controller 82 may dynamically adjust the inlet bleed circuit 38 during operation to control the gas turbine system 10 as described above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:
1. A method of operating a gas turbine system, comprising:
compressing air within a compressor of the gas turbine system to produce pressurized air and bleed air, wherein a bleed outlet of the compressor discharges the bleed air;
producing a first output with a turbine of the gas turbine system, wherein the first output drives the compressor;
directing the bleed air to an inlet bleed circuit coupled to an inlet of the compressor, wherein the inlet bleed circuit comprises a first bleed path, a second bleed path, and a third bleed path configured to provide the bleed air from the bleed outlet to the first bleed path and the second bleed path, wherein the bleed air comprises a non-zero first portion provided to the first bleed path and a second portion provided to the second bleed path, and the second portion is the bleed air less the non-zero first portion;

expanding the non-zero first portion within a turbo-expander connected in the first bleed path to produce a second output;
combining a sub-portion of the non-zero first portion of the bleed air and the second portion of the bleed air to form a part of the bleed air between the turbo-expander and the inlet of the compressor;
recirculating the part of the bleed air to the inlet of the compressor; and
controlling the first output and the second output.

2. The method of claim 1, comprising controlling the first output through adjusting an inlet temperature to the compressor.

3. The method of claim 1, wherein controlling the second output comprises controlling the bleed air as a percentage of the pressurized air.

4. A system, comprising:
a gas turbine, comprising a compressor configured to produce pressurized air and bleed air, and a turbine configured to produce a first output, wherein the compressor is configured to provide the bleed air to a bleed outlet of the compressor;
an inlet bleed circuit comprising a first bleed path, a second bleed path, a third bleed path configured to provide a non-zero first portion of the bleed air to the first bleed path and to provide a second portion of the bleed air to the second bleed path, a fourth bleed path, and a turbo-expander connected in the first bleed path, wherein the turbo-expander is configured to produce a second output from the non-zero first portion of the bleed air, wherein the fourth bleed path is fluidly coupled between the turbo-expander of the first bleed path, the second bleed path, and an inlet of the compressor, wherein the fourth bleed path is configured to direct a part of the bleed air to the inlet of the compressor, the part of the bleed air comprising a sub-portion of the non-zero first portion, the second portion of the bleed air, or the sub-portion of the non-zero first portion and the second portion, wherein the second portion is the bleed air less the non-zero first portion; and
a controller configured to adjust the gas turbine and the inlet bleed circuit to control the second output of the turbo-expander.

5. The system of claim 4, wherein the controller is configured to control the bleed air as a percentage of pressurized air.

6. The system of claim 4, wherein the first bleed path comprises a vent, the controller is configured to direct the non-zero first portion of the first bleed path, and the controller is configured to direct the second portion of the bleed air to the second bleed path.

7. The system of claim 6, wherein the first bleed path is configured to cool the non-zero first portion.

8. The system of claim 6, wherein the controller is configured to control the non-zero first portion based at least in part on an operating condition of the gas turbine.

9. The system of claim 6, wherein the controller is configured to control the non-zero first portion based at least in part on the second output.

10. The system of claim 4, wherein the inlet bleed circuit comprises a valve assembly and the controller is configured to control the valve assembly to adjust an inlet temperature of the compressor.

11. The system of claim 4, comprising a load configured to be driven by the first output of the turbine and the second output of the turbo-expander.

12. A system, comprising:
a gas turbine, comprising:
a compressor having an inlet, an outlet, and a bleed outlet, wherein the compressor is configured to produce pressurized air and bleed air;
a combustion chamber configured to combust the pressurized air to generate exhaust gases; and
a turbine configured to produce a first output using the exhaust gases; and
an inlet bleed circuit coupled between the bleed outlet and the inlet of the compressor, wherein the inlet bleed circuit is configured to receive the bleed air from the bleed outlet and the inlet bleed circuit comprises:
a first bleed path including a turbo-expander configured to receive and expand a non-zero first portion of the bleed air to produce a second output, wherein the first bleed path is configured to direct a sub-portion of the non-zero first portion of the bleed air to the inlet of the compressor;
a second bleed path configured to receive a second portion of the bleed air and to direct the second portion to the inlet of the compressor, wherein the second portion is the bleed air less the non-zero first portion;
a third bleed path configured to provide the bleed air from the bleed outlet to the first bleed path and the second bleed path; and
a first valve assembly configured to couple the first bleed path, the second bleed path, and the third bleed path, wherein the first bleed path and the second bleed path are fluidly coupled in the inlet bleed circuit between the turbo-expander and the inlet of the compressor.

13. The system of claim 12, wherein the first bleed path is configured to cool the non-zero first portion of the bleed air.

14. The system of claim 12, comprising a second valve assembly coupled to the inlet of the compressor and the turbo-expander, wherein the second valve assembly is configured to fluidly couple the sub-portion of the non-zero first portion of the bleed air and the second portion of the bleed air.

15. The system of claim 13, wherein the first valve assembly is configured to adjust a flow of the bleed air as a percentage of the pressurized air and to adjust a ratio of the non-zero first portion of the bleed air to the second portion of the bleed air.

16. The system of claim 15, wherein the inlet bleed circuit comprises a second valve assembly coupled to the inlet of the compressor, the first bleed path, and the second bleed path, wherein the second valve assembly is configured to adjust an inlet temperature of the compressor.

17. The system of claim 16, wherein the flow of the bleed air is adjusted to 6% or less of the pressurized air.

18. The system of claim 12, comprising a controller configured to adjust the first valve assembly to control the inlet temperature of the compressor, the first output of the turbine, or combinations thereof.

19. The system of claim 12, comprising a load configured to be driven at least in part by the second output of the turbo-expander.

* * * * *